(12) United States Patent
Bett

(10) Patent No.: US 6,430,534 B1
(45) Date of Patent: Aug. 6, 2002

(54) METHOD FOR DECODING COEFFICIENTS OF QUANTIZATION PER SUBBAND USING A COMPRESSED TABLE

(75) Inventor: Russell Bett, Hampshire (GB)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/187,987

(22) Filed: Nov. 9, 1998

(30) Foreign Application Priority Data

Nov. 10, 1997 (JP) .............................. 9-307394

(51) Int. Cl.⁷ .............................................. G10L 19/00
(52) U.S. Cl. ...................................................... 704/500
(58) Field of Search ................................ 704/200, 229, 704/500, 200.1

(56) References Cited

U.S. PATENT DOCUMENTS

| | | | | |
|---|---|---|---|---|
| 4,498,173 A | * | 2/1985 | Reudink | 714/746 |
| 4,790,016 A | * | 12/1988 | Mazor et al. | 704/203 |
| 4,972,484 A | * | 11/1990 | Theile et al. | 704/200.1 |
| 5,452,104 A | | 9/1995 | Lee | 358/433 |
| 5,539,829 A | * | 7/1996 | Lokoff et al. | 381/2 |
| 5,991,715 A | * | 11/1999 | Wiese | 704/204 |

FOREIGN PATENT DOCUMENTS

| | | | | |
|---|---|---|---|---|
| DE | 42 29 372 | 3/1994 | | H03M/7/30 |
| EP | 0 661 821 | 7/1995 | | 704/229 |

OTHER PUBLICATIONS

International Standard ISO/IEC 11172–3, First edition, 1993–08–01, 1993 §§2.4.2.5, 2.4.2.6, 2.4.3.3.1, 2.4.3.3.4.*
ISO/IEC 11172–2:1993 (E).

"Final text for DIS 11172–3 (rev. 2): Information Technology–Coding of Moving Pictures and Associated Audio for Digital Storage Media–Part 1–Coding at up to about 1.5 Mbit/s (ISO/IEC JTC 1/SC 29/WG 11 N 0156) 'MPEG 92! –Section 3: Audio" JA, TOKYO, ISO, 1992, pp. III–V, 174–337, XP002083108.

* cited by examiner

Primary Examiner—William Korzuch
Assistant Examiner—Donald L. Storm
(74) Attorney, Agent, or Firm—Wenderoth, Lind & Ponack, L.L.P.

(57) ABSTRACT

Method disclosed is used for compressing the four quantization per subband tables used in MPEG1 layer 2 audio to minimize a required memory size. The method also describes how to decode the compressed tables and use the data to maximize efficiency when reading the audio samples from the input stream, de-grouping and requantization of the audio samples. The efficiency of this method is suitable for use with the implementation of a RISC/micro-processor based MPEG1 layer 2 audio decoder. Specifically, each of the quantization per subband tables are compressed into tables containing a number of parts. Each of the parts being the compressed format of one column. The parts consist of three pairs of data. The first data value of the pair define the subband up to which the nbits value remains the same (subband marker). For the first pair, the nbits remains constant for all subbands from zero to the subband marker. Second and third subband markers refer to the range from that of the previous subband marker to that of the current subband marker. If the current subband number is less than or equal to the subband marker, then the nbits is equal to the second value of the pair. Each pair of data are examined until the nbits has been found or, all three pairs have been searched. If the nbits is not found, nbits is by default equal to zero.

7 Claims, 4 Drawing Sheets

METHOD FOR DECODING COEFFICIENTS OF QUANTIZATION PER SUBBAND USING A COMPRESSED TABLE

BACKGROUND OF THE INVENTION

1. Field of the Invention

The present invention relates to the implementation of linear quantization for use in digital audio encoder and decoder applications.

2. Description of the Related Art

When coding an analogue signal to a digital representation, the values of the analogue signal which can be encoded are restricted to a number of values or quantized steps. For efficient digital encoding, the number of bits representing the audio samples will vary in number. The number of bits per audio sample are stored in a table, being quantization per subband.

MPEG1 (Layer 2) uses four such quantization tables, only one table is used depending on the sampling frequency and bitrate. Each table has sixteen columns and contains data for each of the thirty two subbands. The memory required to store the uncompressed data is 2048×2 bytes.

There are several methods of compressing the four quantization tables, one method is to compress each table's row of data. Repeated rows are not encoded. Also, if other quantization tables comprise the same row information as one previously compressed, then this table need not be encoded. In this manner, the four quantization tables used in MPEG1 (Layer 2) can be compressed into two tables. However, to recreate the original tables, an additional four tables are required. These comprise thirty two values used to point to the start location of the row data stored in one of the two previously compressed tables. This compression method requires memory space for 776×2 bytes.

There are several problems to be solved. The need for better quality digital audio has prompted the increase of quantization levels and thus quantization tables. When designing an audio decoder in LSI using a RISC based processor, the cost of the chip increases with an increase in size. A major factor contributing to the chip size is the amount of memory used. When implementing a software method of decompression, the processing load increases.

SUMMARY OF THE INVENTION

The object of this invention is to provide an efficient method of compression requiring minimal decompression time.

Each of the quantization per subband tables are compressed into tables containing a number of parts. Each of the parts being the compressed format of one column. The parts consist of three pairs of data. The first data value of the pair define the subband up to which the nbits value remains the same, hereinafter referred to as a subband marker. For the first pair, the nbits remains constant for all subbands from zero to the subband marker. Second and third subband markers refer to the range from that of the previous subband marker to that of the current subband marker. If the current subband number is less than or equal to the subband marker, then the nbits is equal to the second value of the pair. Each pair of data are examined until the nbits has been found or, all three pairs have been searched. If the nbits is not found, nbits is by default equal to zero.

The subband marker of the third pair need not be equal to the last subband. For all subbands greater than the value of the subband marker in the last pair the nbits is equal to zero.

In the case of MPEG1 (layer 2) audio decoder, the invention eliminates memory wastage by encoding each of the original quantization per subband tables each into one part containing three pairs of data. For subbands up to and including the first value of the pair, the number of bits representing the audio sample (nbits) is equal to the second value of the pair. The second pair is decoded such that, for subbands greater than that of the first subband marker up to and including the second subband marker, the nbits is equal to the second value of the second part. Similarly for the third part, all subbands greater than the second subband marker up to and including the third subband marker, the nbits is equal to the second value of the third pair. Each pair is tested until the quantization has been determined. Should the nbits remain unresolved after examining the third pair, the nbits is equal to zero.

The quantization data is decoded for each of the subbands using sb as the counter. The appropriate part being indexed by multiplying the bit allocation data by six. The quantization data for all subbands are stored in the __nbits.

Encoding operation is as follows:

After identifying the nominal number of bits required to store an audio sample, If the samples are similar in amplitude, then grouping may be implemented. If so, this is signified by setting bit five of nbits high. After identifying nbits, the quantized sample is applied to a linear formula.

As stated in ISO/IEC 11172-3:1993(E), the subband sample is quantized by applying the value to the following linear formula:

$$Q = AX + B$$

X, being the subband sample divided by the scale factor.

The constants A and B are read from a table, quantization coefficients. A and B are indexed by nbits. If nbit equals three, then nbits is equal to zero. Should nbits be greater than sixteen, the indexing value is equal to the least significant two bits of nbits. Otherwise, the indexing value is equal to nbits. After generating the 25 index value, the A and B values are read and the linear formula is executed.

Decoding operation is as follows.

After storing all quantization data, the quantized audio samples can be read from the bit stream. The number of bits to be read for each quantized audio sample is equal to nbits, nbits being read from __nbits indexed by sb from zero to thirty one. The number of bits to be read is equal to the value of the least significant four bits of nbits. Should the number of bits read from the memory be greater than sixteen, then the quantized audio sample must be degrouped to three quantized audio samples. The quantized audio samples for each subband are stored in memory.

As stated in ISO/IEC 11172-3 1993(E), the quantized audio samples are dequantized by means of a linear formula:

$$S[sb] = C \times (D + qspl[sb])$$

The constants C and D are read from a table, classes of quantization. C and D are indexed by nbits for subband sb. If nbit is equal to three, than nbits is equal to zero. Should nbits be greater than sixteen, the indexing value is equal to the least significant two bits of nbits. Otherwise, the indexing value is equal to nbits. After generating the index value, the C and D values are read and the linear formula is executed.

A first aspect of the invention is a method to compress tables of linear quantization data used to digitally represent analog signals, each table comprising the structure of:

a number of columns being coded into groups of data;

the number of the columns is dependent on the accuracy of the coding and frequency bandwidth of the original signal, hereafter known as allocation;

length of the columns being equal to the number of sub divisions used to split the audio frequency band, hereafter known as subbands; and three pairs of data for means of compressing each of the columns.

A second aspect of the invention is a method of compressing the columns according to the first aspect, comprising of the following steps:

comparing the subband to the first value of the pair hereafter known as subband marker;

when the subband is less than the subband marker, the number of bits used to quantize the sample is equal to the second value of the pair, hereafter being known as nbits;

repeating the comparison of the three pairs is done until the nbits has been found; and following the comparison of all three pairs, the value of the nbits may not be resolved in such a situation, nbits is equal to zero.

A third aspect of the invention is a method implementing the compressed quantization tables according to first and second aspects, for the encoding process comprising the steps of:

selecting the compressed quantization per subband table;

selecting a suitable allocation value for each sample;

multiplying the allocation data value by six to index the compressed quantization table, the indexed value being nbits;

comparing the noise incurred by coding the analogue sample using the nbits to that of the acceptable noise level generated from the psychoacoustic model; and repeating the selection process of the allocation to acquire the least number of the nbits needed to represent the analogue sample at the optimum acceptable noise level.

A fourth aspect of the invention is a method using the allocation to read the nbits from the compressed quantization tables in accordance to first and second aspects, comprising the steps of:

reading the allocation for each and every subband;

storing the allocation to memory hereafter known as alc;

using a counter, known hereafter as sb, to identify subband number;

selecting the compressed quantization per subband table;

reading the allocation, being the alc memory indexed by the sb;

calculating pointer to the compressed quantization per subband table using the allocation multiplied by six;

comparing data being indexed by the pointer to the compressed quantization per subband table with the sb (being the subband marker);

should the sb be less than or equal to the subband marker, the nbits representing the analogue sample, is equal to a value being indexed by the pointer plus one to the compressed quantization per subband table;

comparing the sb to all three of the parts until the nbits has been found;

if, after comparing all three of the parts, the nbits has not been found, the nbits is equal to zero;

the nbits is stored to memory, hereafter being known as __nbits, being indexed by the sb;

the nbits are decoded for all subbands;

reading quantized sample data from the bitstream, hereafter known as qspl, the number of bits representing the qspl being equal to the nbits read from the __nbits being indexed by the sb; and reading of said qspl is repeated for all of the subbands.

A fifth aspect of the invention is a method to quantize/requantize samples comprising application of the samples to a linear formula, comprising the steps of:

reading the nbits for the current subband from __nbits being indexed by the sb;

decoding the nbits, hereafter to be known as linear_ptr;

reading linear constants being indexed by linear_ptr; and applying the linear constants and sample to the linear formula.

DESCRIPTION OF THE PREFERRED EMBODIMENTS

An example of the embodiment will be discussed hereafter. First, a general picture of implementation is explained.

Figure 1:
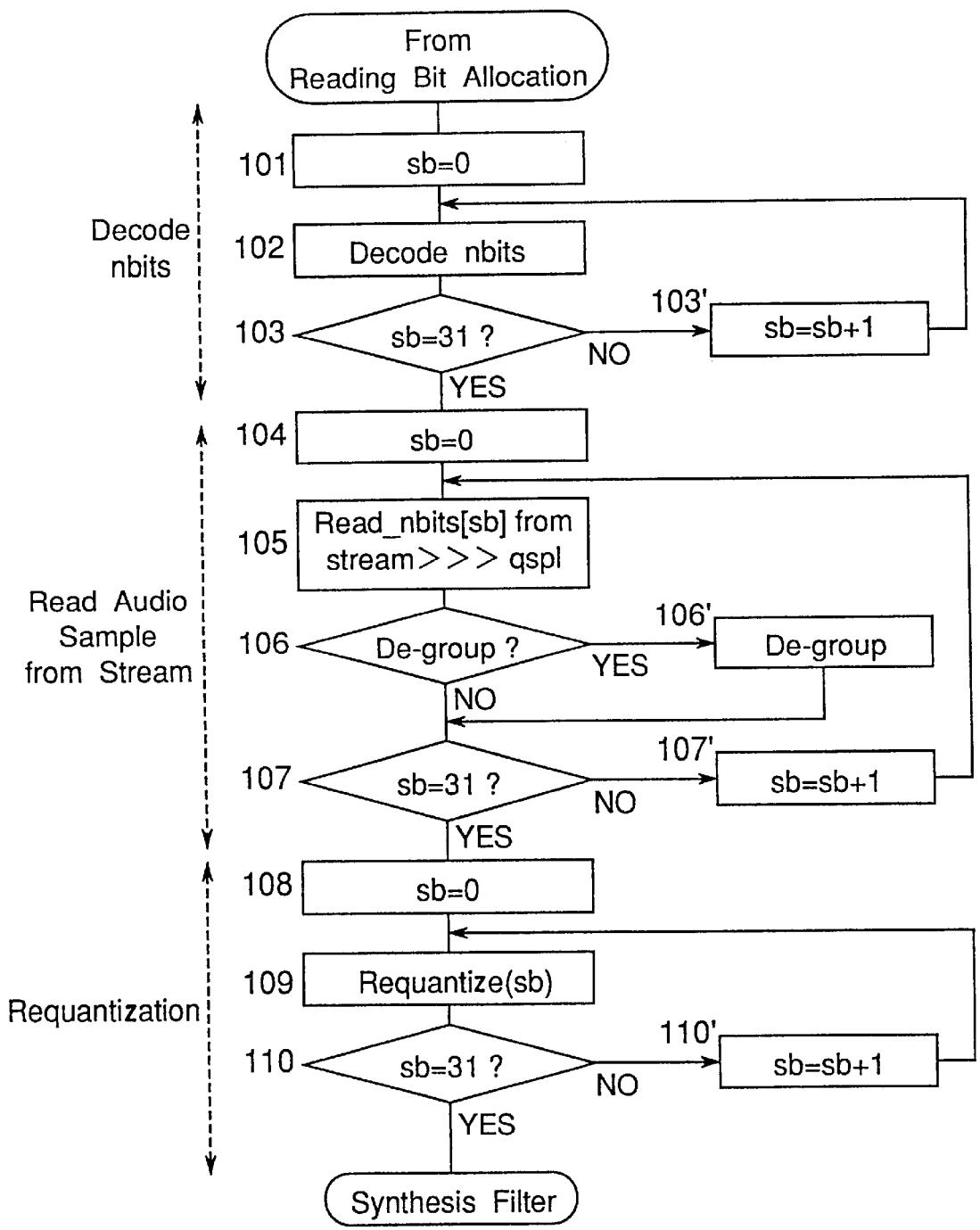
FIG. 1 is a flow chart providing an overview of the processes to decode the compressed quantized levels per subband tables to nbits, using nbits to read the audio samples from the input data stream and requantization of the audio samples read.

FIG. 1 shows the use of compressed quantization tables and data. With reference to FIG. 1, this diagram highlights a small section of the decoding process. First, the number of bits (nbits) to be read from the stream per audio sample is decoded. The process is repeated for each subband, thus using a subband loop pointer, sb, being initialized to zero (step 101). The decoding process (step 102) implements the compressed quantization per sample tables, nbits is stored in array__nbits, indexed by sb pointer. Following the decoding of nbits for each subband, the subband pointer, sb is checked if all subbands have been decoded (step 103), and if not, the sb pointer is incremented (step 103') and the process is repeated. The implementation of this process will be discussed later.

The next stage is to read the audio samples from the stream (step 105), the number of bits read is equal to the value in __nbits, being indexed by the current sb pointer. After reading nbits, if the value is greater than sixteen, the sample read from the stream must be un-grouped (steps 106 and 106'). The audio samples are stored as __qspl, being indexed by sb pointer. Similarly, this process is repeated for all subbands thus looping until sb pointer is equal to thirty one (steps 105–107').

The reading of audio samples and de-grouping can be executed as described in ISO/IEC 11172-3:1993 (E) and will not be described any further.

After reading and storing the quantized audio samples (qspl), the audio samples must be dequantized (step 109). Again, this process is repeated for all subbands, thus using an sb pointer (steps 109–110'). The dequantization process will be discussed in greater detail later.

Next, the decoding of the number of bits per audio sample is described.

Figure 2:
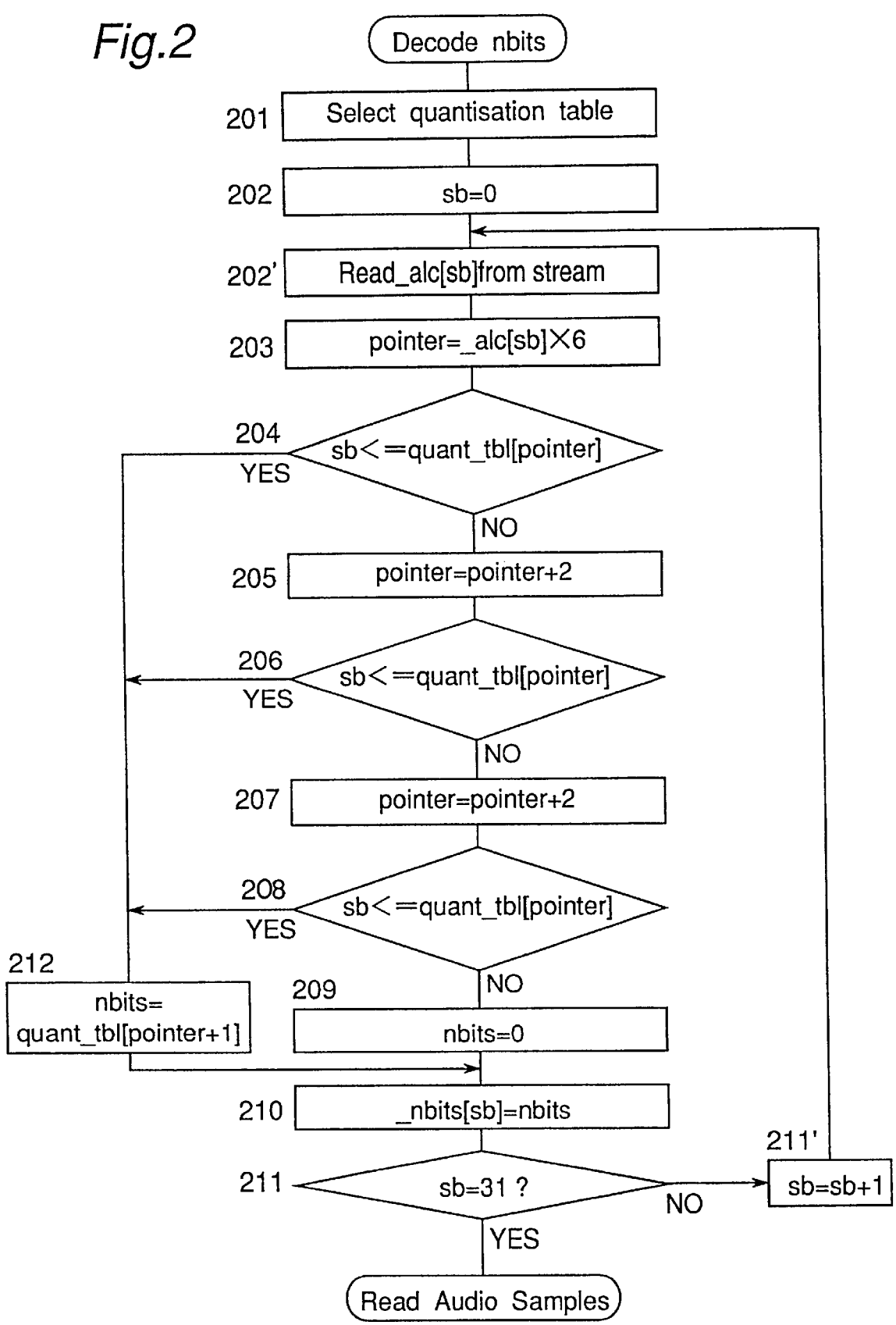
FIG. 2 is a flow chart illustrating the decoding and generation of nbits per subband.

FIG. 2 shows a flow chart for decoding number of bits per subband sample. With reference to FIG. 2, in order to determine which of the four compressed tables to decode, first the sampling frequency and bitrate (step 201) must be decoded from the audio stream header. This information is used to determine the value of sb limit and thus which of the four compressed quantization per subband tables to use, Table 1, Table 2, Table 3 and Table 4. Tables 1, 2, 3, and 4 provided below are used instead of Table B.2a, B.2b, B.2c, and B.2d provided in the ISO/IEC 11172-3 standard.

For example, when Table 1 is selected from the sampling frequency and bit_rate, at sb=0, data will be read from the stream by an amount of nbal bits. This amount is an allocation index, and serves as a line number (base 0) in Table 1. The amount is multiplied by six (6), and the product is used as a Table 1 memory pointer. For example, if the amount is 2, line number 2 in Table 1 is selected. In the table, the amounts stored in that line are (2,3), (26, 23), (31,0). Since sb=0 is smaller than that first entry amount 2 in the first pair (2,3), the first pair (2,3) is selected. From Table 5, quant =3 corresponds to Number of Steps =7.

TABLE 1

Compressed Table B.2a Quantization per subband

| sb pointer | quant. | sb pointer | quant. | sb pointer | quant. |
|---|---|---|---|---|---|
| 31 | 0 | 31 | 0 | 31 | 0 |
| 26 | 21 | 31 | 0 | 31 | 0 |
| 2 | 3 | 26 | 23 | 31 | 0 |
| 2 | 4 | 22 | 3 | 26 | 16 |
| 2 | 5 | 22 | 26 | 31 | 0 |
| 2 | 6 | 22 | 4 | 31 | 0 |
| 2 | 7 | 22 | 5 | 31 | 0 |
| 2 | 8 | 10 | 6 | 22 | 16 |
| 2 | 9 | 10 | 7 | 31 | 0 |
| 2 | 10 | 10 | 8 | 31 | 0 |
| 2 | 11 | 10 | 9 | 31 | 0 |
| 2 | 12 | 10 | 10 | 31 | 0 |
| 2 | 13 | 10 | 11 | 31 | 0 |
| 2 | 14 | 10 | 12 | 31 | 0 |
| 2 | 15 | 10 | 13 | 31 | 0 |
| 10 | 16 | 31 | 0 | 31 | 0 |

TABLE 2

Compressed B.2b Quantization per subband

| sb pointer | quant. | sb pointer | quant. | sb pointer | quant. |
|---|---|---|---|---|---|
| 31 | 0 | 31 | 0 | 31 | 0 |
| 29 | 21 | 31 | 0 | 31 | 0 |
| 2 | 3 | 29 | 23 | 31 | 0 |
| 2 | 4 | 22 | 3 | 29 | 16 |
| 2 | 5 | 22 | 26 | 31 | 0 |
| 2 | 6 | 22 | 4 | 31 | 0 |
| 2 | 7 | 22 | 5 | 31 | 0 |
| 2 | 8 | 10 | 6 | 22 | 16 |
| 2 | 9 | 10 | 7 | 31 | 0 |
| 2 | 10 | 10 | 8 | 31 | 0 |
| 2 | 11 | 10 | 9 | 31 | 0 |
| 2 | 12 | 10 | 10 | 31 | 0 |
| 2 | 13 | 10 | 11 | 31 | 0 |
| 2 | 14 | 10 | 12 | 31 | 0 |
| 2 | 15 | 10 | 13 | 31 | 0 |
| 10 | 16 | 31 | 0 | 31 | 0 |

TABLE 3

Compressed Table B.2c Quantization per subband

| sb pointer | quant. | sb pointer | quant. | sb pointer | quant. |
|---|---|---|---|---|---|
| 31 | 0 | 31 | 0 | 31 | 0 |
| 7 | 21 | 31 | 0 | 31 | 0 |
| 7 | 23 | 31 | 0 | 31 | 0 |
| 7 | 26 | 31 | 0 | 31 | 0 |
| 7 | 4 | 31 | 0 | 31 | 0 |
| 7 | 5 | 31 | 0 | 31 | 0 |
| 7 | 6 | 31 | 0 | 31 | 0 |
| 7 | 7 | 31 | 0 | 31 | 0 |
| 1 | 8 | 31 | 0 | 31 | 0 |
| 1 | 9 | 31 | 0 | 31 | 0 |
| 1 | 10 | 31 | 0 | 31 | 0 |
| 1 | 11 | 31 | 0 | 31 | 0 |
| 1 | 12 | 31 | 0 | 31 | 0 |
| 1 | 13 | 31 | 0 | 31 | 0 |
| 1 | 14 | 31 | 0 | 31 | 0 |
| 1 | 15 | 31 | 0 | 31 | 0 |

TABLE 4 compressed Table B.2d Quantization per subband

| sb pointer | quant. | sb pointer | quant. | sb pointer | quant. |
|---|---|---|---|---|---|
| 31 | 0 | 31 | 0 | 31 | 0 |
| 7 | 21 | 31 | 0 | 31 | 0 |
| 11 | 23 | 31 | 0 | 31 | 0 |
| 11 | 26 | 31 | 0 | 31 | 0 |
| 11 | 4 | 31 | 0 | 31 | 0 |
| 11 | 5 | 31 | 0 | 31 | 0 |
| 11 | 6 | 31 | 0 | 31 | 0 |
| 11 | 7 | 31 | 0 | 31 | 0 |
| 1 | 8 | 31 | 0 | 31 | 0 |
| 1 | 9 | 31 | 0 | 31 | 0 |
| 1 | 10 | 31 | 0 | 31 | 0 |
| 1 | 11 | 31 | 0 | 31 | 0 |
| 1 | 12 | 31 | 0 | 31 | 0 |
| 1 | 13 | 31 | 0 | 31 | 0 |
| 1 | 14 | 31 | 0 | 31 | 0 |
| 1 | 15 | 31 | 0 | 31 | 0 |

The selected table hereafter will be referred to as quant_tbl. The number of bits per audio sample is decoded for each of the thirty two subbands using a loop counter called sb being initialized to zero (step 202). The pointer to quant_tbl (step 203) generated by reading the bit allocation data (step 202') for the current subband and multiplying it by six since there are six data for each subband. The subband marker being indexed by the previously derived pointer, is compared with the current subband counter, sb (step 204). If sb is less than or equal to the value being indexed, the number of audio bits to be read, nbits, is equal to the value indexed by the pointer plus one (step 212). However, if sb is greater than the indexed subband marker, the pointer is incremented by two (step 205) in order to point to the next pair of data. Similarly, the current sb is compared to the subband marker (step 206). Again, if the current sb is less than or equal to the subband marker, nbits is equal to quant_table indexed by the pointer plus one. If sb is greater than the subband marker, the pointer is incremented by two (step 207) before comparing the next pair. Similarly, if the current sb is less than or equal to the final subband marker (step 208), nbits is assigned the value of quant_tbl, indexed by pointer plus one. Since this is the final part, if sb is greater than the subband marker, nbits is set to zero (step 209). The value nbits is stored in memory array nbits (step 210), this being indexed by sb. The decoding of nbits is executed for all thirty two subband samples, therefore, if sb is not equal to thirty one (step 211), sb is incremented by one (step 211') and the decoding process repeats from (step 203) onward.

Next, dequantization is described.

Figure 3:
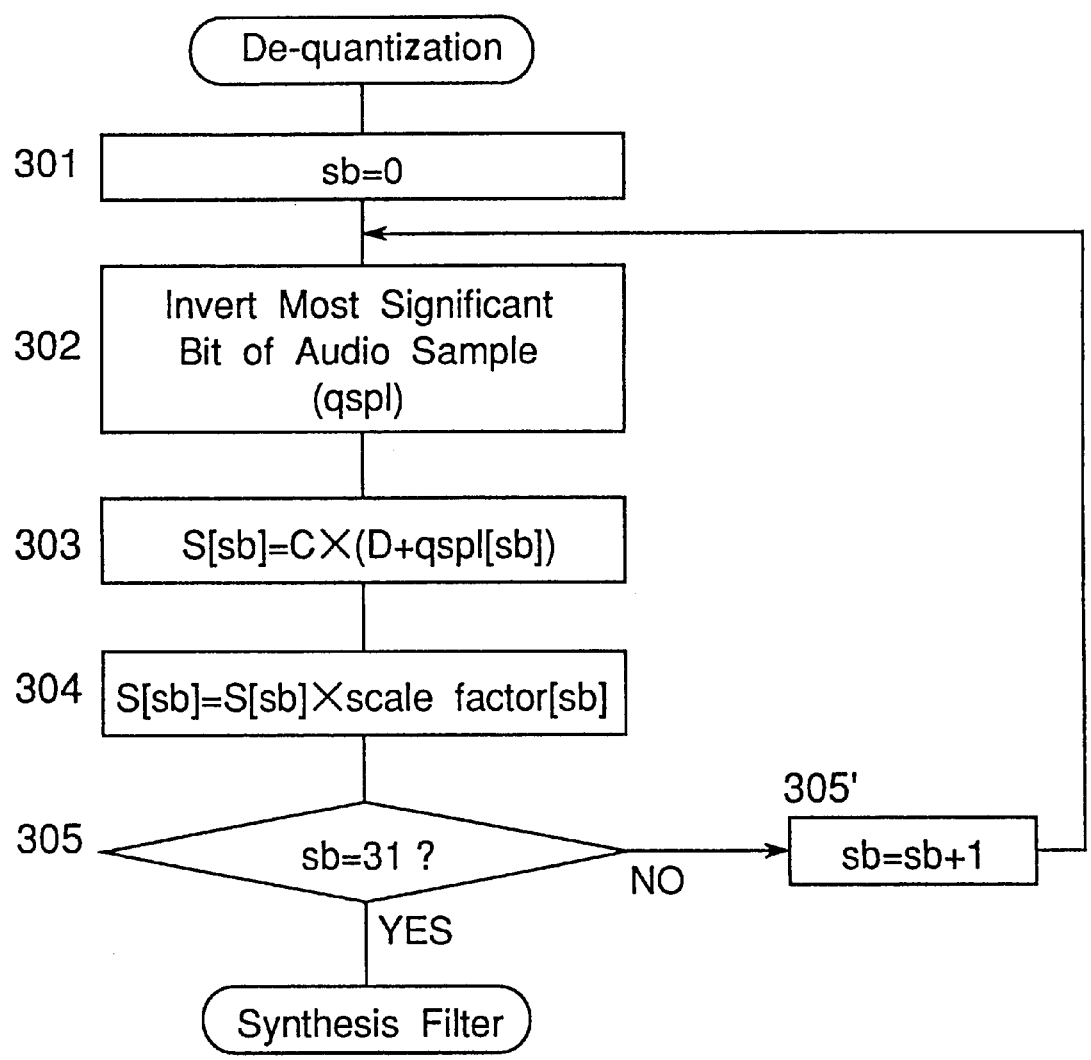
FIG. 3 shows a flow chart showing the processes involved in the requantization of the audio samples.

FIG. 3 is a flow chart for dequantization of quantized audio samples. After the decoding of audio samples (qspl) from the bit stream, the samples must be dequantized. The dequantization process is carried out in three sections, with reference to FIG. 3.

Firstly, (step 302) the most significant bit of qspl is inverted thus producing a two's complement fractional number.

Secondly, a linear formula is applied to the new value of qspl (step 303), this is the only section which differs from the original specification (ISO/IEC 11172-3:1993(E)) and will be described in greater detail later.

The, final part is to scale the requantized value (step 304). The requantization process is executed on all subband samples, thus implementing a subband pointer (sb) first being initiated to zero (step 301) and compared after the requantization of each sample (step 305).

A linear formula is described next.

The linear formula is as specified in ISO/IEC 11172-3:1993(E):

$$S = C \times (D + s'')$$

The process of execution differs from that of the original specification by the process of finding the values of C and D, these are read from the modified table 5. Modified, meaning that the order of rows has been changed to make decoding simpler.

TABLE 5

Layer II Classes of Quantization

| Number of steps | Grouping | Samples per code word | Bits per code word | Encoded quantization |
|---|---|---|---|---|
| 7 | no | 1 | 3 | 3 |
| 3 | yes | 3 | 5 | 21 |
| 9 | yes | 3 | 10 | 26 |
| 5 | yes | 3 | 7 | 23 |
| 15 | no | 1 | 4 | 4 |
| 31 | no | 1 | 5 | 5 |
| 63 | no | 1 | 6 | 6 |
| 127 | no | 1 | 7 | 7 |
| 255 | no | 1 | 8 | 8 |
| 511 | no | 1 | 9 | 9 |
| 1023 | no | 1 | 10 | 10 |
| 2047 | no | 1 | 11 | 11 |
| 4095 | no | 1 | 12 | 12 |
| 8191 | no | 1 | 13 | 13 |
| 16383 | no | 1 | 14 | 14 |
| 32768 | no | 1 | 15 | 15 |
| 65535 | no | 1 | 16 | 16 |

Figure 4:
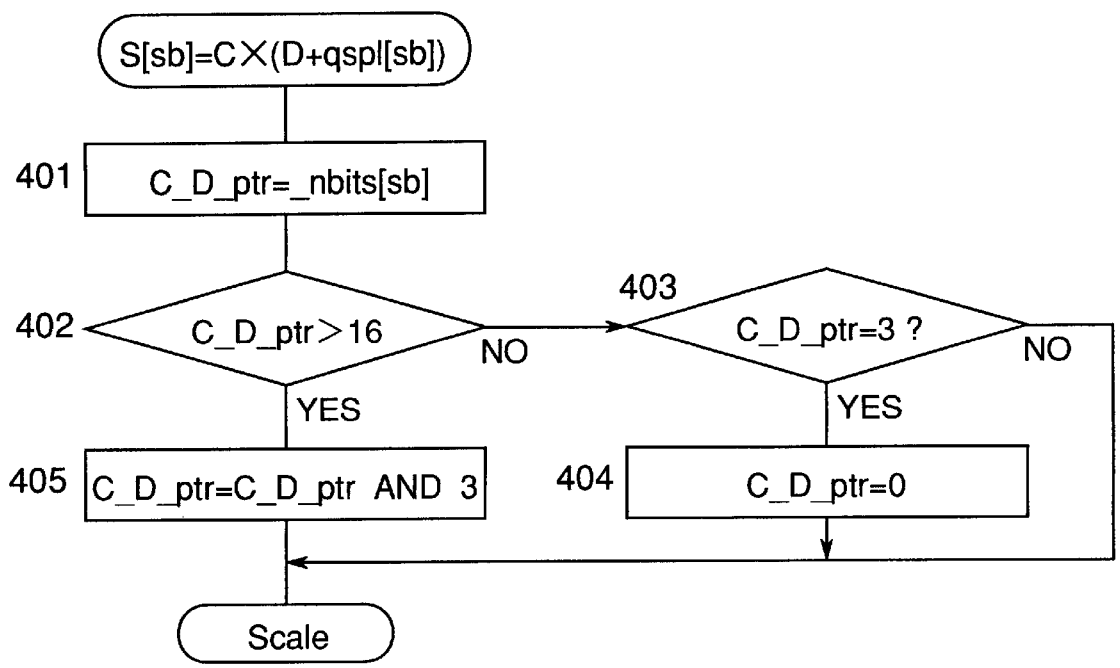
FIG. 4 shows a flow chart to illustrate the use of nbits to index the re-ordered classes of quantization table.

FIG. 4 is a flow chart of decoding C and D index pointer. With reference to FIG. 4, C and D are read from the re-ordered table by a pointer (C_D_ptr), the pointer is initiated to nbits for the current subband (step 401). Should C_D_ptr be less than or equal to sixteen (step 402), the current C_D_ptr value stands valid. However, if C_D_ptr is three (step 403), C_D_ptr becomes zero (step 404). In the case when, C_D_ptr is greater than sixteen, only the least significant two bits of C_D_ptr are valid (step 405). The C and D values can now be read from table 5 using the C_D_ptr as the index.

Clearly, from the above description of this novel table compression technique, implementing this method reduces the amount of memory required to store and decode the quantization levels per subband. The tables are compressed to 384×2Bytes data values being decoded to 32 data values. Not only is this compression method efficient on memory but also decoding process is also efficient on processing time.

What is claimed is:

1. A method to compress tables of linear quantization data used to digitally represent analog signals and used with at least one of a digital audio encoder and a digital audio decoder, said method for each table comprising:

coding a number of columns into groups of data;

providing the number of the columns to be dependent on the accuracy of the coding and a frequency bandwidth of an analog signal, hereafter known as allocation;

providing a length of the columns to be equal to a number of sub divisions used to split the audio frequency band, hereafter known as subbands; and compressing each of the columns using three pairs of data.

2. A method of compressing the columns according to claim 1, comprising:

comparing the subband to a first value of a pair of the three pairs, hereafter known as subband marker;

when the subband is less than the subband marker, a number of bits used to quantize the sample is equal to a second value of the pair, hereafter being known as nbits;

repeating said comparing of the three pairs until the nbits has been found; and following said comparing of all three pairs, in a situation where the value of the nbits may not be resolved, the nbits is equal to zero.

3. A method implementing the compressed quantization tables according to claim 2, comprising:

selecting the compressed quantization table;

selecting a suitable allocation data value for the analog signal;

multiplying the allocation data value by six to index the compressed quantization table, an indexed value being nbits;

comparing noise incurred by coding the analog signal using the nbits to that of an acceptable noise level generated from a psychoacoustic model; and repeating said selection of the allocation to acquire the least number of the nbits needed to represent the analog signal at the acceptable noise level.

4. A method using the allocation to read the nbits from the compressed quantization tables in accordance to claim 2, comprising:

reading the allocation for each and every subband;

storing the allocation to a memory hereafter known as alc;

using a counter, known hereafter as sb, to identify a subband number;

selecting the compressed quantization table;

reading the allocation, being the alc memory indexed by the sb;

calculating a pointer to the compressed quantization table using the allocation multiplied by six;

comparing data being indexed by the pointer to the compressed quantization table with the sb (being the subband marker);

should the sb be less than or equal to the subband marker, the nbits representing the audio sample is equal to a value being indexed by the pointer plus one to the compressed quantization table;

comparing the sb to all three of the pairs until the nbits has been found;

if, after comparing all three of the pairs, the nbits has not been found, the nbits is equal to zero;

the nbits is stored to memory, hereafter being known as __nbits, being indexed by the sb;

the nbits are decoded for all subbands;

reading quantized sample data from a bitstream, hereafter known as qspl, the number of bits representing the qspl being equal to the nbits read from the __nbits being indexed by the sb; and reading of the qspl is repeated for all of the subbands.

5. A method implementing the compressed quantization tables according to claim 1, comprising:

selecting the compressed quantization table;

selecting a suitable allocation data value for the analog signal;

multiplying the allocation data value by six to index the compressed quantization table, an indexed value being nbits;

comparing noise incurred by coding the analog signal using the nbits to that of an acceptable noise level generated from a psychoacoustic model; and repeating said selection of the allocation to acquire the least number of the nbits needed to represent the analog signal at the acceptable noise level.

6. A method using the allocation to read the nbits from the compressed quantization tables in accordance to claim 1, comprising:

reading the allocation for each and every subband;

storing the allocation to a memory hereafter known as alc;

using a counter, known hereafter as sb, to identify a subband number;

selecting the compressed quantization table;

reading the allocation, being the alc memory indexed by the sb;

calculating a pointer to the compressed quantization table using the allocation multiplied by six;

comparing data being indexed by the pointer to the compressed quantization table with the sb (being the subband marker);

should the sb be less than or equal to the subband marker, the nbits representing the audio sample is equal to a value being indexed by the pointer plus one to the compressed quantization table;

comparing the sb to all three of the pairs until the nbits has been found;

if, after comparing all three of the pairs, the nbits has not been found, the nbits is equal to zero;

the nbits is stored to memory, hereafter being known as __nbits, being indexed by the sb;

the nbits are decoded for all subbands;

reading quantized sample data from a bitstream, hereafter known as qspl, the number of bits representing the qspl being equal to the nbits read from the __nbits being indexed by the sb; and reading of the qspl is repeated for all of the subbands.

7. A method to quantize/requantize samples comprising application; of the samples to linear formula, comprising;

reading nbits for a current subband from __nbits being indexed by sb which is a counter;

decoding the nbits, hereafter to be known as linear_ptr;

reading linear constants being indexed by the linear_ptr, wherein the linear constants are read from a modified table in which an order of rows has been changed; and applying the linear constants and sample to the linear formula.

* * * * *